(12) United States Patent
Bless et al.

(10) Patent No.: US 7,258,364 B2
(45) Date of Patent: Aug. 21, 2007

(54) PROGRESSIVE TRANSLATION MECHANISM

(76) Inventors: Werner Bless, Weidstrasse 33, CH-8808, Pfaffikon (CH); Erwin Rott, Sonnenbuhlweg 3, CH-8630, Ruti (CH)

( * ) Notice: Subject to any disclaimer, the term of this patent is extended or adjusted under 35 U.S.C. 154(b) by 278 days.

(21) Appl. No.: 10/518,954

(22) PCT Filed: Jun. 20, 2003

(86) PCT No.: PCT/CH03/00399

§ 371 (c)(1),
(2), (4) Date: Dec. 17, 2004

(87) PCT Pub. No.: WO04/000628

PCT Pub. Date: Dec. 31, 2003

(65) Prior Publication Data

US 2005/0230952 A1    Oct. 20, 2005

(30) Foreign Application Priority Data

Jun. 20, 2002  (CH)  ................................ 1049/02
Jun. 20, 2002  (CH)  ................................ 1057/02
Jun. 20, 2002  (CH)  ................................ 1058/02

(51) Int. Cl.
*B62D 1/00*     (2006.01)

(52) U.S. Cl. .................. 280/771; 74/492; 280/93.502; 280/93.506

(58) Field of Classification Search ................ 280/771, 280/93.502, 93.506, 93.508, 93.509, 93.514; 74/492
See application file for complete search history.

(56) References Cited

U.S. PATENT DOCUMENTS 6,287,207 B1 *  9/2001  Rui et al.  ................... 464/162

FOREIGN PATENT DOCUMENTS

| DE | 1064829 | * | 9/1959 |
| DE | 19519588 | * | 7/1995 |
| EP | 915003 | * | 11/1998 |
| EP | 001199244 A1 | * | 4/2002 |
| GB | 419842 | * | 11/1934 |
| GB | 2024980 | * | 1/1980 |

* cited by examiner

*Primary Examiner*—Eric Culbreth
(74) *Attorney, Agent, or Firm*—Robert L. Epstein; Epstein Drangel Bazerman & James

(57) ABSTRACT

The invention relates to a translation mechanism (20) on a progressive gear (1), preferably a steering gear on a vehicle, with an input shaft (10) and an output shaft (30). Said translation mechanism (20) comprises three moving parts (21, 23), which are jointed together and fixed to levers (11, 31) on the input shaft (10) and the output shaft (30), such that a translation with a linear progression in the range −180° to +180° is achieved from the input shaft (11) to the output shaft (30). The advantage of a said translation mechanism (20) lies in the lack of play in the mechanism and the direct force transfer due to the suitable relative angles of the individual components and the economical production thereof.

13 Claims, 5 Drawing Sheets

PROGRESSIVE TRANSLATION MECHANISM

Figure 1A:
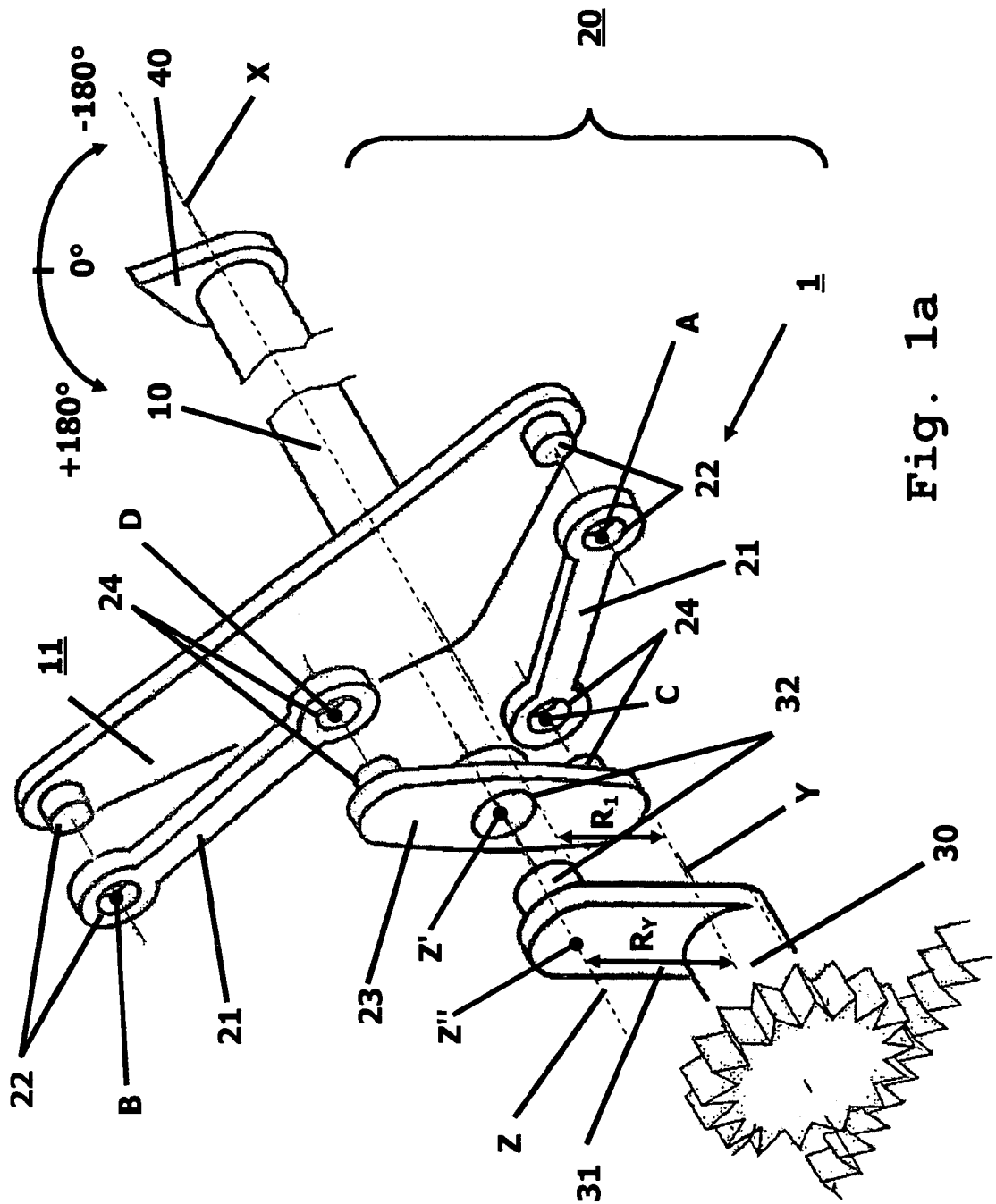

The invention relates to a transmission mechanism of a progressive gear between a driving shaft and a driven shaft.

Progressive gears are widely used. One of the most important uses are all kinds of steering gears but predominantly all kinds of steering gears of controlled transportation means, for example steering gears of vehicles.

A gear is a device for the transmission or conversion of motions. Of interest herein are gears which convert a rotational movement of a driving shaft into a rotational movement of a driven shaft. In the case of a steering gear of a vehicle, the driving shaft is coupled directly or indirectly to a steering wheel while the driven shaft is coupled to a mechanism suitable for causing a change of direction of the vehicle to be steered. In a rack-and-pinion-steering device, these mechanisms generally comprise a pinion which is coupled to the driven shaft, and a steering rack which engages the pinion. Upon turning the steering wheel, the steering rack is displaced and turns the wheels to be steered by means of steering track rods. Other examples of these mechanisms comprise cam-and-roller steering gears and recirculating ball steerings among others.

In contrast to gears having a linear relationship between the driving shaft and the driven shaft, progressive gears exhibit a non-linear relationship between the rotation of the driving shaft and the rotation of the driven shaft.

Using a vehicle as an example, the effect of a turn of the steering wheel by a certain angle is therefore dependent on the momentary position of this steering wheel. Advantageously, this effect will be small if the steering wheel straight is in a position and will increase the more the steering wheel is turned. This ensures precise steering around the straight position at high speed since even a relatively large movement of the steering wheel will merely cause a small change in the direction of motion. In contrast, during maneuvering when the steering wheel is already very much turned a small rotary movement of a progressive steering will result in an very large change in the direction of motion. This is especially desired in the case of parking to efficiently change from one lock of the wheel position to the other.

EP 0 915 003 B1 (Wanfluh) provides a vehicle steering mechanism having a variable gear transmission ratio which contains a total of four axes of rotation all of which intersect in one point. The disadvantage of this steering assembly is that not all levers are in one plane but that they exhibit steep angles with respect to each other. This technically tricky and unstable solution is tolerance-sensitive and requires high efforts with respect to the precision of the elements not to show too much backlash. This results in high assembly costs because the bearings must be adjusted precisely with high effort. The steepness of the steering mechanism decreases the sensitivity of the steering mechanism because the sensation for the mechanism is lost due to the steep angle connection. The relatively dead steering mechanism in the range of straight-ahead driving changes very abruptly to a steering mechanism with high progression upon a steering wheel turn of about 75° as can be seen from FIG. 6 of the above-mentioned document. Furthermore, the same FIG. shows that the maximum possible turning angle of the steering wheel is limited to 105° on both sides. This is another disadvantage of this solution since the whole steering range has to be performed in not more than 210°.

The document DE 195 19 588 A1 (Honda) provides another steering gear having progressive characteristics. In this steering gear the variability of the gear transmission ratio is based on the fact that although the driven shaft of the steering gear is arranged in parallel with respect to the driving shaft, it is offset (eccentric) to the latter. To couple the driving shaft to the driven shaft, an intermediate element is arranged between the two shafts which essentially fulfils the function of a slider crank (sliding joint in combination with a hinge) and transmits the torque from the driving shaft or an extension, respectively, which connected in a rotationally fixed manner to the driving shaft to the driven shaft. The tendency of the effect of a steering gear of this type might be desired since the steering behaviour harmonically increases in a progressive way upon an increase in the turning of the steering wheel. However, the embodiment according to the above-mentioned document does not ensure a backlash-free course.

EP 0 915 003 B1 includes a comprehensive list containing further known solutions of progressive steering gears together with the different technical embodiments and the shortcomings thereof.

It is an object of the present invention to create a progressive transmission mechanism of a gear which is suitable as a steering gear for vehicles and which is characterized by the fact that the gear transmission mechanism is tolerance-insensitive, works free of backlash without any adjustment and shows a favourable ratio of forces. Furthermore, the embodiment is intended to be space-saving and shall be possibly assembled in a plate.

According to the invention this object has been achieved by the invention described below.

Figure 1B:
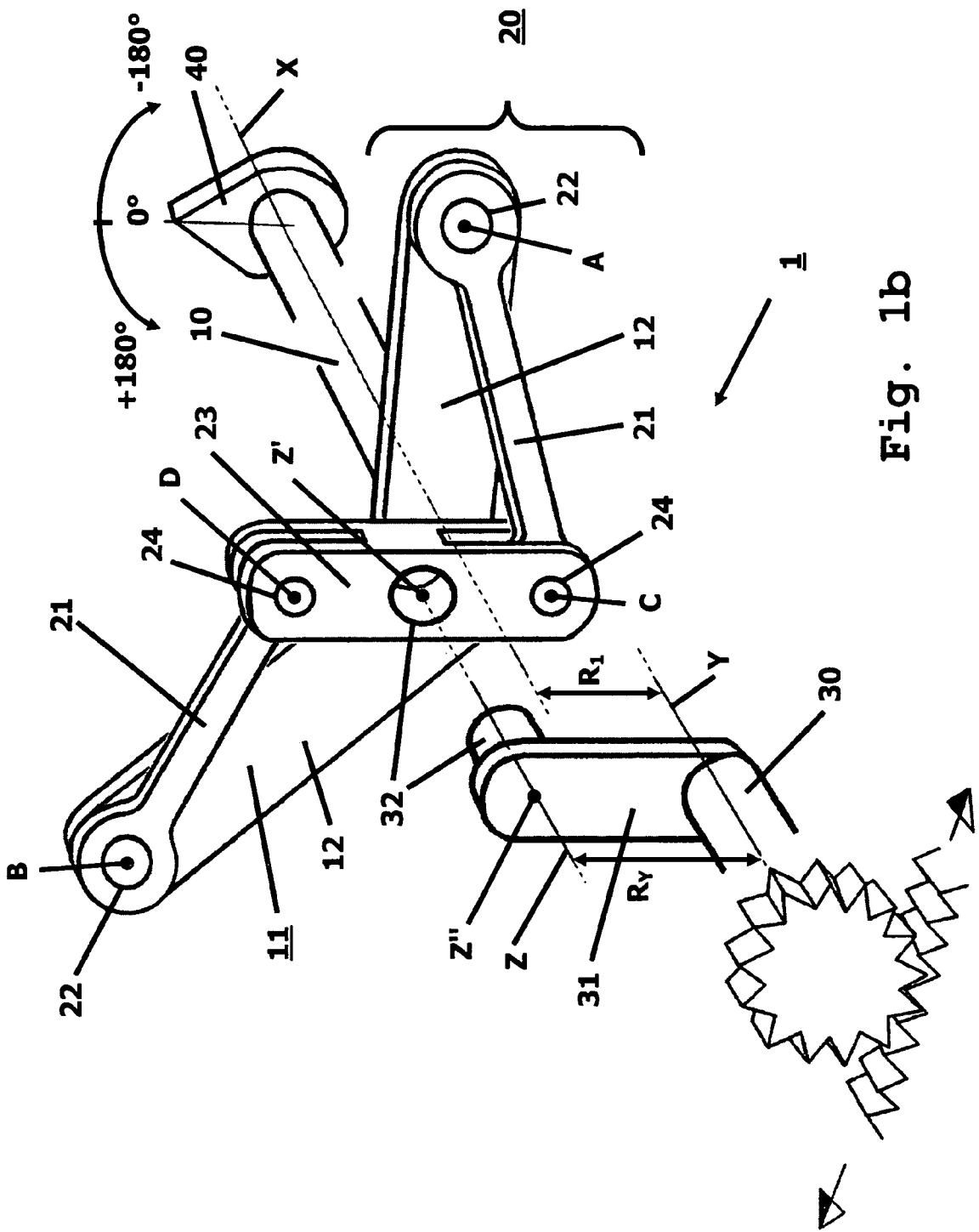
Figure 2:
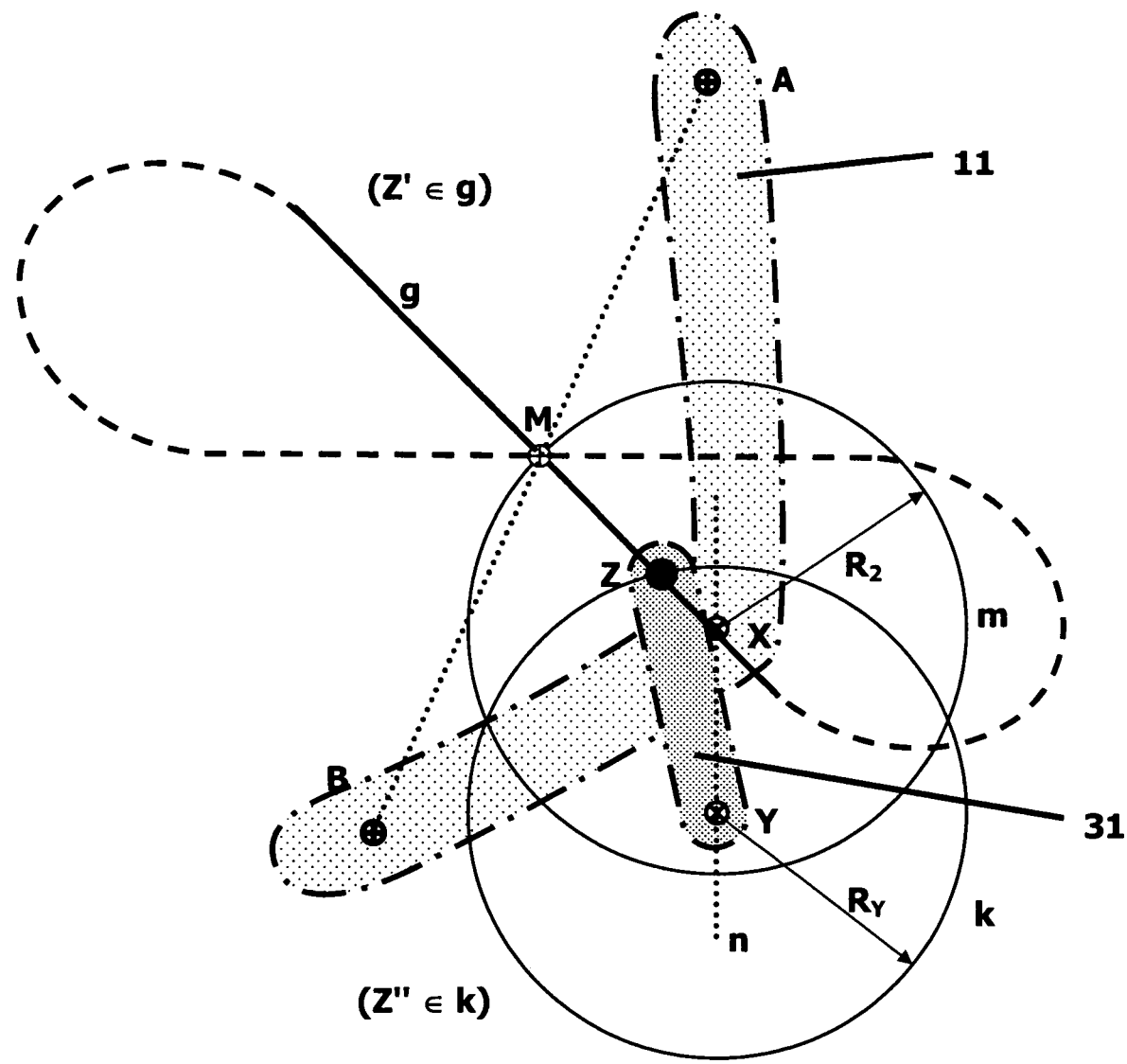
Figure 3:
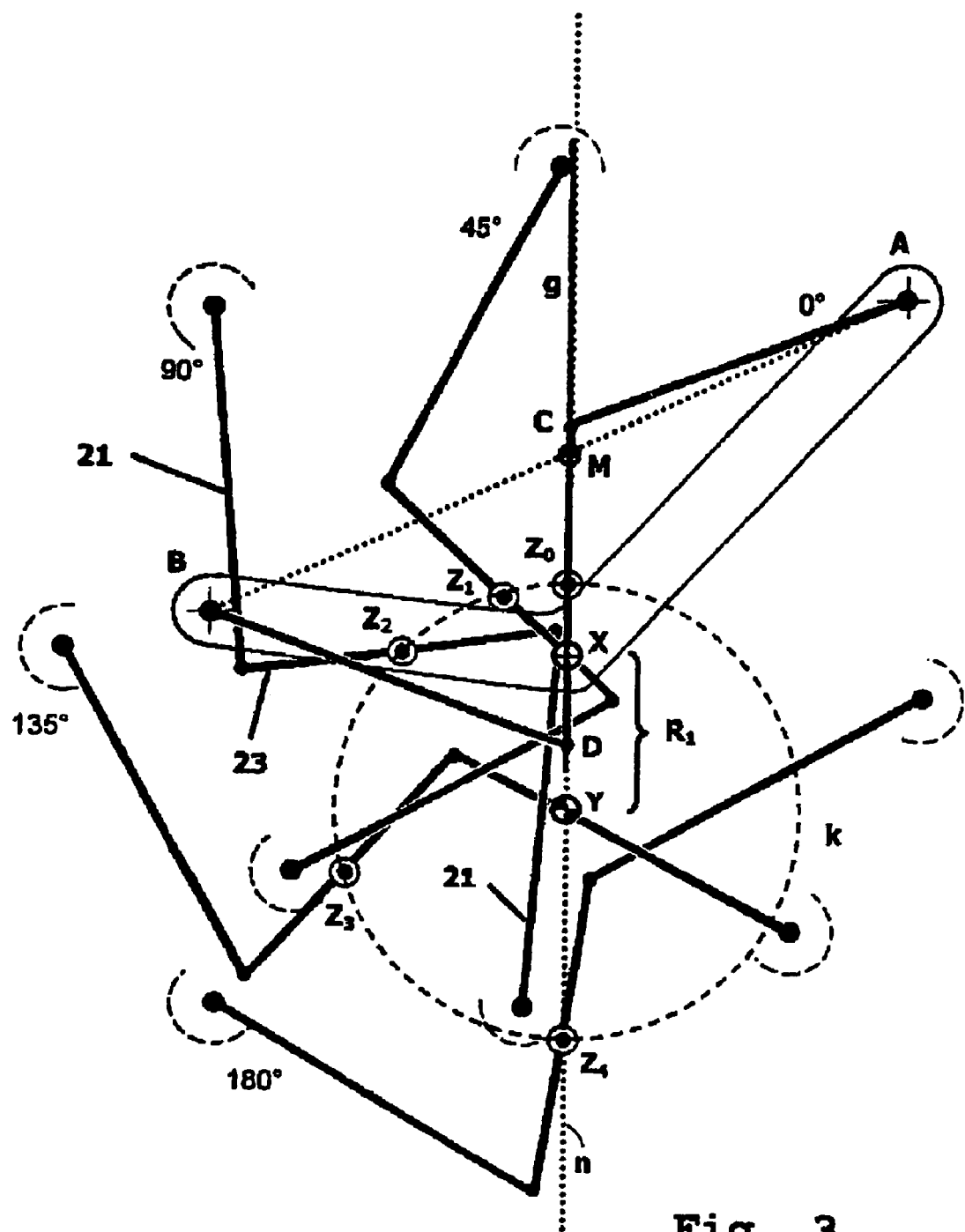
Figure 4:
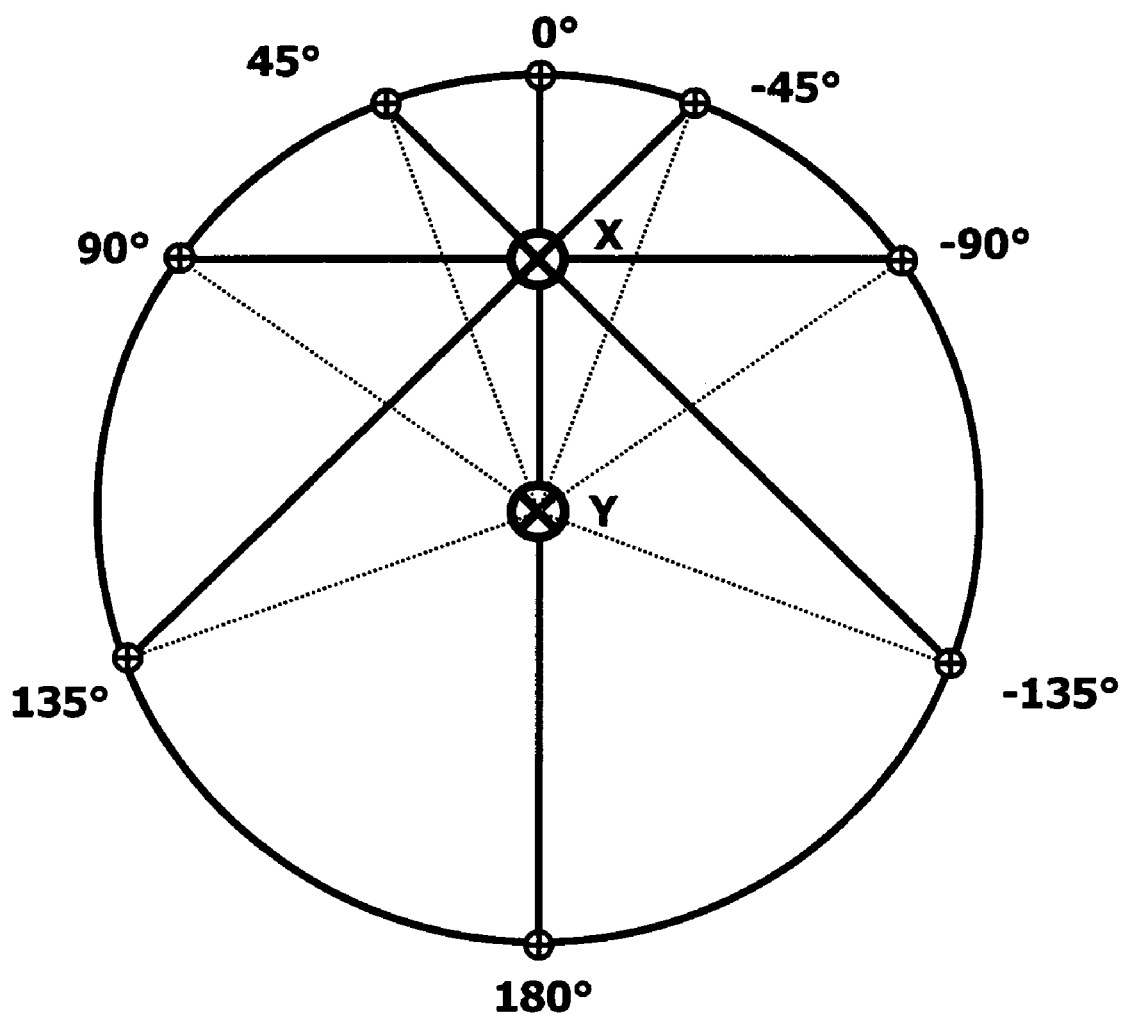

In the following, the invention will be described in more detail with respect to the drawings. The FIGS. show:

FIG. 1a a perspective schematic exploded representation of one possible embodiment of the transmission mechanism according to the invention viewed from the direction of the driven shaft;

FIG. 1b another perspective schematic representation of one possible embodiment of the transmission mechanism according to the invention viewed from the direction of the driven shaft which is partially assembled;

FIG. 2 a representation of a possible movement pattern of the axis of an output joint;

FIG. 3 a graphic representation of different positions of the sides and of the coupler during a half turn of the steering wheel; and FIG. 4 a graphic representation of different points of the output joint during a full turn.

FIGS. 1a and 1b show, in slightly differing embodiments and representations, a driving shaft 10 having an axis X, a driven shaft 30 having an axis Y, and a transmission mechanism 20. A steering wheel 40 is represented symbolically at the driving shaft 10 and connected in a rotationally fixed manner thereto. At the other end of the driving shaft 10 and also connected in a rotationally fixed manner thereto is a driving lever 11. It can be embodied by a plate, see FIG. 1a or by two impellers, see FIG. 1b. Any other form of the driving lever 11 may be selected which enables a spaced, articulated connection of two movable parts in the desired positions. The term impeller which used in the following shall not be construed as limiting.

The axis Y of the driven shaft 30 essentially extends in parallel to the axis X of the driving shaft 10 exhibiting an offset $R_1$. An output lever 31 is connected in a rotationally fixed manner to the driven shaft 30.

The transmission mechanism 20 contains three movable parts, namely two links 21 and a coupler 23. At each of the outer ends of the two impellers 12 of the driving lever 11 there is connected one of the links 21 in a one-sided manner by means of a link joint 22. The other two ends of the links 21 are connected to the coupler 23 by means of coupling joints 24.

In between the two coupling joints 24 at the coupler 23 there is located a device for an output joint 32 at which the output lever 31 is attached. All these joints 22, 24, 32 allow for pivoting movements in a plane perpendicular to the driving shaft 10 and at the same time prevent movements in any other direction.

A pinion and a steering rack are indicated at the driving shaft 30 which merely serve as an illustration of a possible mechanism of a steering and shall be in no way construed as limiting.

Another difference between the FIGS. 1*a* and 1*b* is the embodiment of the joints 24. Basically, different embodiments can be contemplated and are possible. It is of decisive importance, however, for this invention that the joints 22, 24, 32 are all designed in a space-saving manner and allow for movements within a plane so that the embodiment of the transmission mechanism 20 will be flat. In this manner, it can be bundled in the form of a plate.

Rolling bearings or plain bearings can be used as the joints, or any equivalent solution known to those skilled in the art can be applied.

It is not necessary that the axes X of the driving shaft 10 and Y of the driven shaft 30 are parallel. By using spherical bearings the inclination angle of the steering wheel can be adjusted.

The way of functioning of the gear will be described in the following with reference to FIGS. 2, 3, and 4:

In an example of a preferred embodiment the links 21 are of the same length, the axes A and B of the two link joints 22 have a different distance from the axis X of the driving shaft 10, and the axis Z' of the output joint 32 on the coupler 23 (FIGS. 1*a* and 1*b*) is centrally located between the axes C and D of the coupling joints 24. The movable parts 21, 23 of the transmission mechanism 20 are able to perform a periodic UNIVARIANT movement if the position of the steering wheel 40 is fixed. During this movement, the axis Z' of the output joint 32 on the coupler 23 passes through a closed path which in the projection onto the plane of the driving lever 11 can be represented by the form of a long-stretched eight. An example of this path is represented in FIG. 2 as a dotted long-stretched "8". In this respect it should be noted that a wide central area of this curve forms a straight line g. In the arrangement according to the invention, the axis Z' of the output joint 32 on the coupler 23, of the whole possible path described, in each case will only pass through an area within one of the straight line segments referred to as g.

According to the invention care should be taken that the positions of the axes A and B of the two link joints 22 on the driving lever 11 are chosen in a way that the straight line segment g passes through the axis X of the driving shaft 10.

The central point M of the described path having the form of an eight is centrally located between the two axes A and B of the two link joints 22. The distance from the central point M of the path to the axis X of the driving shaft 10 is referred to as $R_2$. The position of the central point M of the path relative to the axis X of the driving shaft 10 can be interpreted as a momentary position of a steering wheel 40. Therefore, during a turn of the steering wheel 40 −180° from to +180° the central point M of the path describes a circular path m around the axis X of the driving shaft 10 having a radius of $R_2$.

During a rotary movement of the driven shaft 30 the axis Z" of the output joint 32 on the output lever 31 FIGS. 1*a* and 1*b* describes a circular path k around the axis Y of the driven shaft 30 having a radius of $R_Y$ which is given by the distance of the axis Y of the driven shaft 30 to the axis Z" of the output joint 32 on the output lever 31. This circular path k is represented in FIG. 2.

Since within axis Z of the output joint 32 there are always combined the axis Z' of the output joint 32 on the coupler 23 and the axis Z" of the output joint 32 on the output lever 31, the axis Z of the output joint 32 is always located on the intersection point which the straight line segment g (possible residence area of Z') shares with the circular path k of the output lever 31 (possible residence area of Z"). This is true for any possible angular position of the steering wheel 40.

In FIG. 3 the links 21 and the coupler 23 are symbolically represented as lines in the positions 0°, 45°, 90°, 135°, and 180°. The position 0° corresponds to the position of the gear 1 which has the highest transmission ratio and corresponds to the position of straight-ahead driving in the example of a steering gear.

The dimensions of this preferred example are chosen in a way that during straight-ahead driving both the coupler 23 and the straight line segment g are located on the connecting straight line n which also includes the axes X of the driving shaft 10 and Y of the driven shaft 30. During straight-ahead driving, the axis Z of the output joint 32 also is on this straight line n. In this example of an embodiment, also both distances of the axes A and B of the two side joints 22 to the axis X of the driving shaft 10 are different in length. Upon turning the steering wheel 40 by a certain angle, the straight line segment g rotates around the axis X of the driving shaft 10 by the same angle as that of the steering wheel 40. At the same time, the axis Z of the output joint 32 is displaced along the circular path k around the axis Y of the driven shaft 30. The distinct points $Z_i$ (i=0, 1, 2, 3, 4) designate the momentary positions of the output joint 32 around the axis Y of the driven shaft 30 wherein the angle of rotation between individual positions of the driving shaft 10 in each case is 45°. The distribution of the positions $Z_i$ on the circular path k mediates the linear progressive behaviour of the transmission mechanism 20.

The individual momentary positions of the axes $Z_i$ of the output joint 32 are also depicted in FIG. 4. The driving shaft 10 can be turned by 180° into each direction. In this movement, the movement of the driving shaft 10 transmitted by the transmission mechanism 20 according to the invention also results in a rotation of the driven shaft 30 by 180° in each direction wherein the angle increments Alpha i of the driving rotation are non-linear with respect to the angle increments Alpha i' of the driven rotation. This becomes clear from FIG. 4.

Since the distances of the two axes A and B of the side joints 22 to the axes C, D of the coupling joints 24 in FIG. 3 are of the same length and the output joint is arranged in the centre of the coupler 23, the two links 21 during straight-ahead driving have essentially the same angle with respect to straight line n which generally is between 45° and 90°, preferably between 70 and 80°, and in this example is about 75°. Accordingly, the two axes A and B of the link joints 22 have the same distances to the straight line n as those of axes X of the driving shaft 10 and Y of the driven shaft 30.

The distance $R_2$ of axis X to the central point M of the path on the straight line segment g shown in FIG. 2 according to the invention is of the same order as the radius $R_Y$ of the circular path k around axis Y of the driven shaft 30, and has at least half the size thereof and not more than double the size thereof.

The movement in this area around the central point M of the path is advantageous for the force transmission from the driving shaft 10 to the movable parts 21, 23 because the individual movable part do not show any steep angles with respect to each. In each case, the most direct force transmission will be achieved if the device for guiding the force is located in the direction of movement of the part to be moved. This means that in the arrangement according to the invention the movable parts should be as perpendicular to each other as possible. Therefore, the length and distance relationships of the transmission mechanism 20 should be advantageously selected in a way that the angles between the links 21 and the coupler 23 during a full rotation of the steering mechanism do not become sharper than 45° and not more obtuse than 135°.

Is has been found reasonable to select the distance of the axes A and B of the side joints 22 from the straight line n in the order of double the radius $R_Y$ of the circular path k of the axis Z of the output lever 31 around axis Y of the driven shaft 30 (2 $R_Y$). The larger this distance is, the more direct are the force transmissions because the angles do not differ much from 90°. On the other hand, the greater the distance of axis A or B of the link joints 22 which is spaced farther away from the axis X of the driving shaft is, the more space will gear 1 require since the whole circular area around axis X of the driving shaft 10 which has the radius of the longer impeller 12 of the driving lever 11 will be needed upon one rotation of the driving shaft 10.

Accordingly, a compromise solution is often desirable which differs from the optimal geometric situation in favour of a smaller space requirement of the whole gear 1.

It is not absolutely required to select the links sides 21 with the same length, and it is also not absolutely required to place the output joint 32 in the centre of coupler 23. An asymmetry of this kind, however, is not desired for a steering mechanism since this may lead to the occurrence of an asymmetric steering behaviour upon turning the steering wheel 40 to the left or to the right, respectively. For other applications, where this symmetry is not required, however, a gear 1 of this type can be contemplated.

The length ratios and angles of a preferred embodiment can be obtained or measured, respectively, from FIG. 3.

For the application of a steering mechanism of a vehicle, size ratios have been found favourable wherein the total diameter of the space requirement is between 15 cm and 35 cm. For this purpose, the distance of the axes A and C or B and D, respectively, of joints 22, 24 on the links 21 is selected between 60 and 100 mm in length, preferably between 80 and 90 mm. It has been found advantageous to select coupler 23 shorter than the sides 21. A distance of the axes C and D of the coupling joints 24 on the coupler 23 of between 40 and 80 mm, preferably between 60 and 70 mm has been found suitable. Furthermore, a distance $R_Y$ of the axes Y of the driven shaft 30 and Z of the output joint 32 on the output lever 31 of between 30 and 70 mm, preferably of between 40 and 50 mm is sought.

The offset $R_1$ of the axes X of the driving shaft 10 and Y of the driven shaft 30 is responsible for the amount of progression. Reasonable orders of magnitude for this offset $R_1$ are between 10% and 100% of the distance $R_Y$ of axis Z of the output lever 31 around axis Y of the driven shaft 30. Practical experiments have shown that during straight-ahead driving a transmission in the order of 20:1 from a turn of the steering wheel to the alignment of the wheels is regarded as comfortable and stable for the driver. Upon complete turning of the wheels this ratio should be in the range between 3:1 and 2:1, and preferably is about 2.5:1. This is for example achieved if the offset $R_1$ between the axis X of the driving shaft 10 and the axis Y of the driven shaft 30 is selected to about 70% of the distance $R_Y$ of the axis Z of the output lever 31 to the axis Y of the driven shaft 30, and in any case between 50 and 90% thereof.

Thus, by changing the ratio of $R_1$ to $R_Y$ the transmission ratio of a steering mechanism provided by a transmission mechanism according to the invention 20 can be adjusted to the requirements at any time, particularly also during driving. For this purpose, one of the axes X of the input shaft or Y of the output shaft can be displaced with respect to the other.

All dimensions can differ from those mentioned above as the ideal ratios as long as the mechanical rotation is still ensured. Although in this case the force transmissions will no longer be optimal, other dimensions and proportions can be advantageous in particular fields of use, for example to reduce the total space requirement of the gear or to increase the lever action in certain positions of rotation.

If the transmission mechanism 20 according to the invention is used it can be additionally contemplated to also arrange the steering rack and/or the pinion of a rack-and-pinion steering in a progressive manner in order to enhance the progression by about further 30-35%.

The gear 1 described herein can be combined with any other type of steering mechanism as well as with the rack-and-pinion steering described herein. Conventional measures such as a power assisted steering, predetermined breaking points and any other type of steering system as well as angular gears can be used in a similar manner as heretofore.

Any conventional vehicle can also be retrofitted by a suitable embodiment of this transmission mechanism 20 according to the invention. For example, to perform an adjustment to the pre-existing pinion of a rack-and-pinion steering a planetary gear can be mounted onto the driven shaft 30 which has the required conversion to achieve the desired path of the steering rack at each turn of the steering wheel from −180° C. to +180° C.

Besides its main filed of use, i.e. the progressive steering of vehicles, the progressive transmission according to the present invention can also be used in other fields, for example in the driving of bicycles wherein the driving chain is driven by the driving shaft and the transmission gear is formed in such a way that at maximum effectiveness of the pressure on the bicycle treads, i.e. at an essentially horizontal position of the bicycle crank which is connected in a rotationally fixed manner to the driving shaft, the maximum transmission of the transmission gear occurs, and that at minimum effectiveness of the pressure on the bicycle treads, i.e. at an essentially vertical position of the bicycle crank which is connected in a rotationally fixed manner to the driving shaft, the minimum transmission of the transmission gear occurs.

Advantages of this transmission gear 20 according to the invention are the favourable ratio of forces of the driving shaft 10 onto the driven shaft 30, zero backlash and tolerance-insensitivity without any fine adjustments as well as an easy and cheap fabrication and mounting of the gear 1.

The present invention creates a practically linear progressive gear which is suitable as a steering gear for vehicles, particularly motor- and muscle-driven vehicles. Basically, the input shaft and the output shaft can be exchanged for each other. The designations chosen therefore should not be construed as limiting for the direction of force input.

Furthermore, an advantageous progression can be achieved wherein upon straight-ahead driving the ratio of the steering angle to the trailing angle is about 20 to 1 and decreases in a linear manner by about 8-fold to approximately a ratio of 2.5 to 1 up to the range of a complete turn.

LIST OF DESIGNATIONS 1 gear
10 driving shaft
11 driving lever
12 impeller of the driving lever
20 transmission mechanism
21 link
22 link joints
23 coupler
24 coupling joints
30 driven shaft
31 output lever
32 output joint
40 steering wheel
A, B axes of the side joints
C, D axes of the coupling joint
$R_1$ offset between axis X of the driving shaft and axis Y of the driven shaft
$R_2$ distance of the central point M of the path between axes A and B of the two side joints to the axis X of the driving shaft
$R_Y$ radius of the circular path k of the axis Z of the output lever around axis Y of the driven shaft
g straight line segment
k circular path of the axis Z of the output lever around axis Y of the driven shaft
M central point between axes A and B of the two side joints
n connecting straight line through axis A of the driving shaft and axis Y of the driven shaft
X axis of the driving shaft
Y axis of the driven shaft
Z axis of the output joint
Z' axis of the output joint on the coupler
Z'' axis of the output joint on the output lever

The invention claimed is:

1. A transmission mechanism (20) of a progressive gear (1), of a steering gear of a vehicle, between a driving shaft (10) with an axis (X) and a driven shaft (30), characterized by a driving lever (11) connected in a rotationally fixed manner to the driving shaft (10), as well as two links (21) each having a first and a second end, the first end of each of the links (21) being connected at spaced locations by joints (22) to the driving lever (11), the second ends of each of the links (21) being connected at spaced locations to a coupler (23), coupler (23) being connected to an output lever (31) which can be connected in a rotationally fixed manner to the driven shaft (30) and which is connected by an offset (Ry) to the axis (Y) of the driven shaft (30) at the coupler (23) wherein the axes (X, Y) of the driving shaft (10) and the driven shaft (30) are essentially in parallel and show an offset to each other and wherein all connections that are not rotationally fixed enable pivoting movements within a plane essentially transverse to the axes (X, Y) of the driving shaft (10) and the driven shaft (30).

2. A transmission mechanism according to claim 1 characterized in that all length and distance relationships are selected in such a way that when mounted, a circular movement of the driving shaft (10) and the driven shaft (30) is mechanically ensured.

3. A transmission mechanism according to claim 1 characterized in that the ratio of the offset (RY) between the axes (X) of the driving shaft (10) and (Y) of the driven shaft (30) to an offset of an axis of an output joint (32) and (Y) of the driven shaft (30) is at least between 1:10 and 10:10.

4. The transmission of claim 3 wherein the ratio is between 5:10 and 9:10.

5. The transmission of claim 3 wherein the ratio is 7:10.

6. A transmission mechanism according to claim 1 characterized in that the axes (A, B) of the joints (22) and the axis (X) of the driving shaft (10) form a triangle wherein the distances of the joints (22) to the axis (X) of the driving shaft (10) are different.

7. A transmission mechanism according to claim 1 characterized in that the links (21) are of the same length.

8. A transmission mechanism according to claim 1 characterized in that the angles between the sides (21) and the coupler (23) during one circular movement do not become sharper than 45° and not more obtuse than 135°.

9. A transmission mechanism according to claim 1 characterized in that the total space requirement of the gear (1) during a turn has a diameter between 15 cm and 35 cm.

10. A transmission mechanism according to claim 1 characterized in that it is provided at the driven shaft (30) with a planetary gear.

11. A transmission mechanism according to claim 1 characterized by a plate shaped design.

12. A transmission mechanism according to claim 1 characterized by an at least approximately linear progression and a symmetric behavior in both directions of the starting position.

13. A transmission mechanism according to claim 1 characterized by a variable offset (R1) between the axes (X) of the driving shaft and (Y) of the driven shaft (30).

* * * * *